July 29, 1969     F. E. YANKEE     3,458,138
SPRAY GUN
Original Filed Aug. 14, 1963
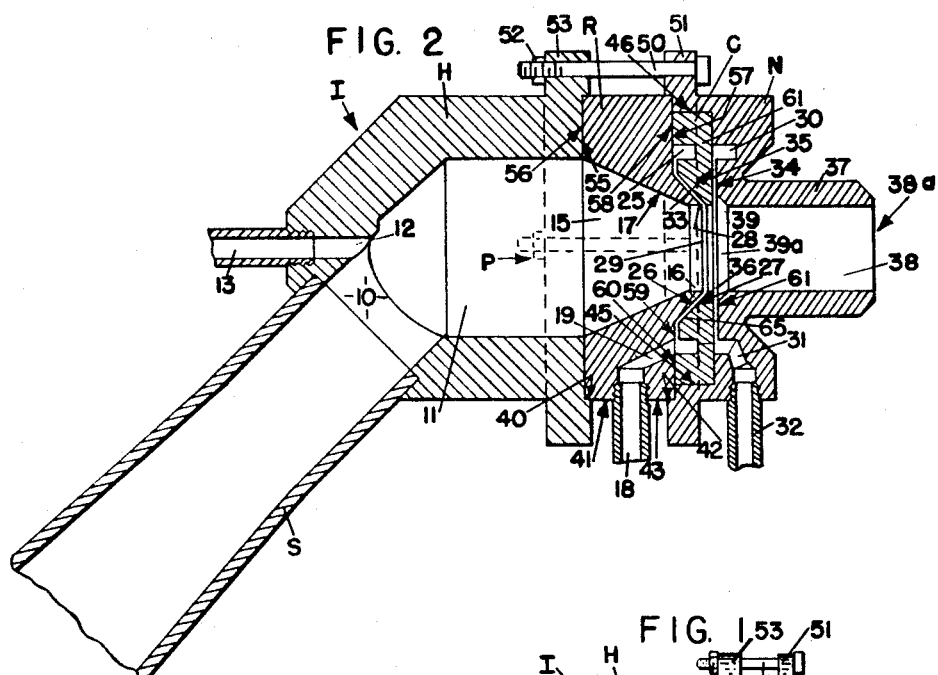
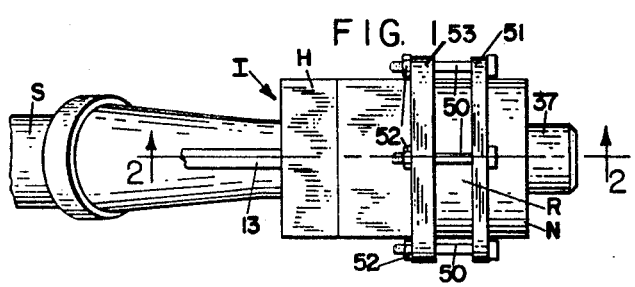
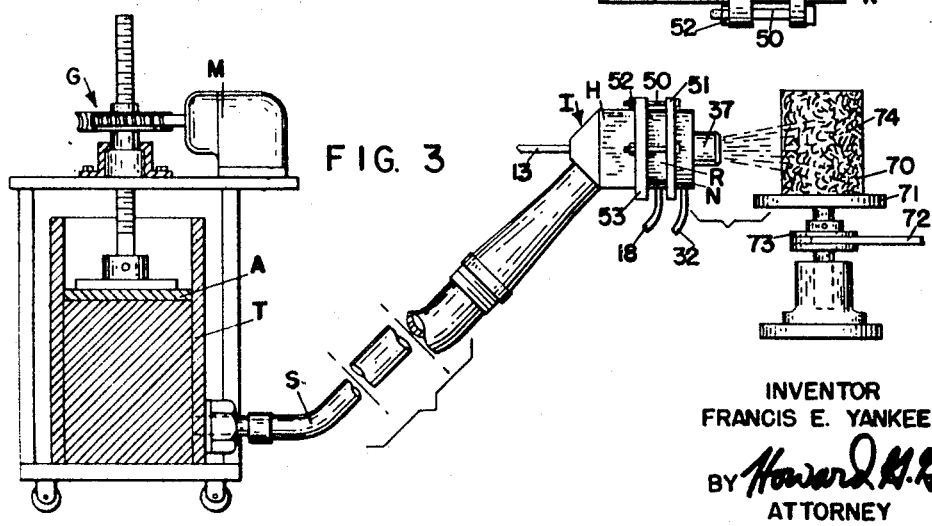
INVENTOR
FRANCIS E. YANKEE
BY *Howard G. Garmong*
ATTORNEY United States Patent Office 3,458,138
Patented July 29, 1969

3,458,138
SPRAY GUN
Francis E. Yankee, Seekonk, Mass., assignor to Crompton & Knowles Corporation, Worcester, Mass., a corporation of Massachusetts
Original application Aug. 14, 1963, Ser. No. 302,187.
Divided and this application Sept. 14, 1967, Ser. No. 699,747
Int. Cl. B05b 7/06
U.S. Cl. 239—428                    4 Claims

ABSTRACT OF THE DISCLOSURE

An apparatus for aerating a viscous mixture of resin and fiber preparatory to mixing a catalyst therewith immediately prior to spraying said mixture on to a surface to be coated by a resin and fiber mixture.

---

This application is a division of my application Ser. No. 302,187, filed Aug. 14, 1963, now abandoned.

This invention relates to an extruding implement and it is the general object of the invention to provide such an implement which can convert a semifluid viscous mass into a sufficiently fluid condition to be sprayed.

Difficulty has been experienced in making dense mixtures of plastic and reinforcing materials fluid enough to be sprayed. It is an important object of the present invention to provide an implement which will receive a substantially air-free thick semifluid mixture of a plastic material such as polyester reinforced with fibrous material such as glass fiber and subject the mixture to the action of air and a catalyst in such a way as to convert it into a sprayable liquid.

It is a further object of the invention to provide a method effective to subject a semifluid mixture of plastic and reinforcing material to the action of compressed air and a catalyst in such manner as to reduce the mixture to a sprayable condition.

In spraying operations of the kind more particularly referred to herein there is a tendency for the catalyst to produce fog after it has been added to the material. To prevent fog or at least reduce the amount of it issuing from the implement, it is a further object of the invention to provide a delivery nozzle having a sufficiently long discharge bore to enable the material to absorb the fog before being delivered as a spray from the implement.

It is a still further object of the invention to provide means in the discharge bore or in the passage for the mixture of plastic and reinforcing material to set up turbulence in the mixture and deliver a catalyst to the turbulent mass, whereby the latter absorbs much if not all of the fog which may develop.

It is a still further object of the invention to make the implement of four separate members having cooperating parts which hold them in concentric relation with respect to the axis of the passage and provide also for holding the four members in tight relationship by forces exerted longitudinally of the passage. A further object relates to one of said parts which provides for turbulence and delivery of the mixture.

In order that the invention may be clearly understood reference is made to the accompanying drawings which illustrate by way of example the embodiments of the invention and in which:

FIG. 1 is a plan view of the implement forming the subject matter of the present invention, FIG. 2 is an enlarged section on line 2—2 of FIG. 1, and FIG. 3 is an elevation partly diagrammatic, showing one use to which the invention can be put.

It is to be understood that the implement set forth herein is used in connection with a pressure tank T or the like effective to deliver a semifluid substantially air-free mixture of plastic and reinforcing material to a flexible hose or pipe S which permits mobility in handling the implement. The mixture is delivered to the hose S at a uniform rate by means of a motor M which, through suitable speed reducing means G, drives a piston member A in the tank T. There will be a source of compressed air capable of adjustment to vary the pressure and also means to supply the desired catalyzing agent.

Referring more particularly to FIG. 2, the implement is designated generally as I and comprises a head member H, a reduction member R, a catalyst member C, and a nozzle member N. The head member has an inlet port or bore 10 to receive material from hose S and deliver it to an enclosed chamber 11 the diameter of which is greater than that of the inlet port. The head has a smaller inlet port 12 for introducing air under pressure from pipe 13 into the chamber.

The reduction member R has a frusto-conical cavity 15 which communicates with chamber 11 and tapers away from the latter to a reduced port or bore 16 smaller than port 10. The internal surface 17 of the reduction member R has the effect of reducing the cross section of the material received from the chamber and thereby increasing its rate of travel. A pipe 18 is tapped into the member R as shown in the lower part of FIG. 2 and communicates with a passage 19 to deliver a catalyzing agent received from the pipe 18.

The catalyst member C is provided with a circular recess 25 which opens toward the passage 19 and receives the catalyzing agent delivered by pipe 18. The member R has a guide surface 26 which is spaced slightly from an adjacent surface 27 of the catalyst member C and cooperates with the latter to define a frusto-conical space 28 between members R and C communicating with recess 25 and through which the catalyst is delivered. The inner end of space 28 forms a ring outlet 29 through which the catalyst issues in the form of a cone directed to the right, FIGURE 2, away from outlet port 16 and into a passageway P.

The nozzle member N is provided with a circular recess 30 which communicates with passageway P and a passage 31 in a part of the nozzle member N into which is tapped a pipe 32 to deliver compressed air between members N and C and into recess 30. The members C and N have surfaces 33 and 34 respectively separated by a space 35 which provides for the passage of compressed air from the recess 30 to an inwardly opening ring outlet 36. The member N has a discharge or delivery tube or nozzle 37 provided with an outlet bore 38 the inner end of which has a chamber 39 to cause turbulence in material entering the outlet bore. The outlet bore may be considered to include the port 16 and to extend to the delivery outlet 38a at the right-hand end of nozzle 37, see FIGURE 2. The bore has a diameter less than that of port 10 or chamber 11.

The four members H, R, C and N fit together in such manner as to keep them substantially concentric with the axis of the passageway P through the implement. They are also fastened to each other by means which exert forces substantially parallel to the passageway.

The head member H has a narrow internal cylindrical surface 40 which receives an external cylindrical surface 41 on the member R, and in similar manner the member N has an internal cylindrical surface 42 into which fits an external cylindrical surface 43 on member R. Surfaces 41 and 43 are concentric and can be of the same diameter, if desired. The catalyst member C has an external cylindrical surface 45 which fits into an external cylindrical surface 46 on nozzle member N. The pairs of surfaces 40 and 41, 42 and 43, and 45 and 46 form cooperating means by which the head, reduction, catalyst and nozzle members are held together against relative transverse motion with respect to each other and the axis of the passageway P.

Plane surfaces on the various members perpendicular to the axis of the passageway of the implement engage each other as shown in FIGURE 2 and are held together in tight abutment with each other by screws 50 which pass through a flange 51 on the member N and are drawn tight against the latter by nuts 52 which engage another flange 53 on the head member H through which the screws pass, see FIGURE 1. Members H and R have flat abutting surfaces 55 and 56 respectively, members R and C are held between members H and N and have surfaces 57 and 58 respectively, members R and N have surfaces 59 and 60 respectively, and member N has a surface 61 which cooperates with surface 57 to clamp the member C tightly in place, see FIGURE 2. These flat surfaces are held tightly against each other by screws 50, as will be apparent from FIGURES 1 and 2.

In use the material, which may be a mixture of commingled polyester and glass fiber, is delivered from tank T through hose S substantially air-free and semifluid into the chamber 11 in a condition too viscous for spraying. To make it sprayable air under pressure from pipe 13 is injected into the chamber 11 to aerate the mixture so that it becomes expanded and is made mobile. The air from inlet port 12 also serves to move the mixture along the passageway in the implement toward the nozzle member. The surface 17 has the effect of increasing the rate of flow of the expanded mixture as it approaches outlet bore 38. When the mixture passes over the chamfer 39, a turbulence will be created which will assist the mixture to absorb any fog which may result from delivery of a catalyst through passage 65 between members R and C. This passage may have a width of the order of 0.005 inch. It will be seen from the direction of slope of this passage 65 that the catalyst is delivered into the passage as a cone pointed toward the outlet or discharge end 38a of the outlet bore 38. The passageway through the implement has a direction suggested by arrow P, FIGURE 2, and extends through the chamber and cavity, port 16, bore 38 and outlet 38a. The several members mentioned provide the means for forming the passageway.

Air from pipe 13 acts as a first blast to blow the mixture through the cone of the catalyst and deflects the second blast which issues as a sheet of air from ring orifice 36 toward the discharge end 38a. Both blasts or streams of air are therefore instrumental in moving the mixture out of the bore 38 of nozzle member N.

FIGURE 3 shows one way in which the invention can be utilized to make a product. The implement I can be held by means not shown and the nozzle 37 pointed toward a mold 70 which, in the present instance, is a cylinder standing up from a table 71 which is rotated by a belt 72 trained around a pulley 73 fixed with respect to the table 71. As the cylinder 70 turns, the spray mixture is projected against fresh areas of surface 74 of the mold and this procedure continues until a sufficient depth of the mixture has accumulated on the mold. It has been found in actual experience with the implement that satisfactory results can be obtained if the air introduced from pipe 13 is at a pressure of about 40 p.s.i. and if the air delivered by pipe 32 is at a pressure of about 70 p.s.i. The catalyst can be any convenient agent, such as methylethylketone peroxide. The diameter of the port 16 is less than the internal diameter of hose S, and the latter is smaller than the diameter of the chamber 11. The diameter of the bore 38 is substantially the same as that of the port 16 and the bore is of a sufficient length to enable the material passing through it to absorb all or nearly all of the catalyst, and any fog which it may develop.

An implement made as described and in the proportions shown in FIGURE 2 with the diameter of chamber 11 being about 1½ inches and a length slightly more than one inch has been used to deposit reinforced plastic material at the rate of about 120 pounds an hour. A mixture which has given satisfactory results contains about 20% of short glass fibers ¼″ to ⅜″ long, 77% polyester resin, and 3% filler which may for instance be of mineral origin. The product to be made with the invention need not necessarily be a cylinder as shown, but can take other forms, such as a laminate.

An important feature of the invention resides in the method by which the mixture is treated. In order to deliver a uniform mixture to the implement enough pressure is employed at the tank to expel practically all air from the mixture. By maintaining the same pressure at the tank assurance is given that in equal units of time equal amounts of mixture will be delivered to chamber 11. By keeping the pressure of air from pipe 13 uniform the same condition of expansion and aeration of the mixture will continue in the chamber, and by introducing the catalyst near the inner end of outlet bore 38 enough time will be allowed for the mixture to absorb much if not all of the fog which develops in the bore. There is likely to be some small amount of unabsorbed catalyst which reaches the mold to continue the setting effect after deposit of the mixture on the mold. While the mixture is in the outlet bore 38 it is pushed through the catalyst cone which folds down around the mixture.

The invention is not limited to the sizes or pressures or materials named, but it is desirable that chamber 11 be large enough to permit considerable expansion of the mixture, and the short glass fibers have been found to move along without much if any entanglement. Other resins may be used, such as epoxy, furan, phenolic, etc. As examples of products which can be made according to this invention, mention may be made of tanks, low pressure piping, ducting, hoods, coatings for wood, concrete, etc.

From the foregoing it will be seen that the invention sets forth a plastic spraying implement wherein a dense semifluid substantially air-free mixture of a plastic resin and reinforcing fibers is delivered into the chamber 11 to be aerated and then projected through a sheet of catalyst and thereafter discharged from the nozzle. The implement is made of several members which are held together as a unit by tie bolts or screws 50 with the members centered by interengaging cylindrical surfaces. The chamfer 39 between the members N and C near the latter forms a groove 39a with member C opening into passageway P and causes a turbulence in the mixture, and outlet bore 38 extends a sufficient distance from the chamfer to permit any fog which might develop to be absorbed by the aerated mixture. The catalyst is projected by cooperation of members R and C across the passageway P in the form of a cone which folds down around the mixture and penetrates open spaces resulting from aeration. The members R, C and N are held in position so their closely adjacent but spaced surfaces define passages of a width of approximately 0.005″ for the catalyst and compressed air from the pipes 18 and 32 respectively. The converging surface 17 acts to increase the rate of motion of the mixture. Furthermore, the invention sets forth a method for converting a semifluid mixture of a plastic resin and reinforcing material, as glass, into a sprayable condition by addition of a catalyst as described.

Having now particularly described and ascertained the nature of the invention and in what manner the same is to be performed, what is claimed is:

1. A spraying implement comprising:
   (a) a housing defining an expansion chamber;
   (b) an inlet bore having a capacity substantially less than said chamber for admitting material into said chamber along a longitudinal axis;
   (c) an inlet port for directing a stream of fluid under pressure into said chamber along a longitudinal axis to intersect with said material entering said chamber whereby said material is expanded and aerated within said chamber;

(d) an elongated outlet bore having a capacity less than said chamber for directing said expanded material from said chamber;

(e) means for directing a catalyst into said bore adjacent said chamber so as to impinge upon and to intermix with said material within said bore; and (f) means for directing a stream of fluid into said bore between its outlet opening and the point at which said catalyst is directed into said bore to impinge upon the mixture of said material and said catalyst to agitate said mixture and to force it through said outlet opening.

2. In a spraying implement as set forth in claim 1 wherein said streams of fluid directed into said chamber and said bore cooperate to force said mixture of material and catalyst out of said outlet bore.

3. In a spraying implement as set forth in claim 1 wherein said means for directing said catalyst into said bore is a ring opening.

4. In a spraying implement as set forth in claim 3 wherein said ring opening is directed into said bore at an angle and the catalyst enters the bore in the form of a cone.

References Cited

UNITED STATES PATENTS

| | | | |
|---|---|---|---|
| 1,876,610 | 9/1932 | Case | 239—336 |
| 2,437,042 | 3/1948 | Prosser et al. | 239—428 |
| 2,578,412 | 12/1951 | Fisher | 239—428 |
| 2,747,934 | 5/1956 | Fisher | 239—428 |
| 3,073,534 | 1/1963 | Hampshire | 239—428 |
| 3,126,157 | 3/1964 | Dickerson | 239—336 |

FOREIGN PATENTS 478,882  1/1938  Great Britain.

EVERETT W. KIRBY, Primary Examiner

U.S. Cl. X.R.

239—422, 424, 335, 336